United States Patent [19]

Burcham

[11] Patent Number: 4,577,971

[45] Date of Patent: Mar. 25, 1986

[54] BLENDING RUBBER FOR RETREADING

[76] Inventor: George R. Burcham, 104 E. Mohawk Dr., LaFollette, Tenn. 37766

[21] Appl. No.: 457,366

[22] Filed: Jan. 12, 1983

[51] Int. Cl.$^4$ .............................................. B01F 15/04
[52] U.S. Cl. ...................................... 366/76; 366/79; 366/156; 366/162
[58] Field of Search .................. 156/397, 405.1, 406.1; 366/76, 77, 79, 96, 97, 98, 99, 143, 154, 155, 156, 160, 162, 305, 306, 307, 309, 319; 425/17

[56] References Cited

U.S. PATENT DOCUMENTS

| | | |
|---|---|---|
| 1,024,937 | 4/1912 | Heller . |
| 2,377,069 | 5/1945 | Brubaker ............................... 366/155 |
| 2,462,645 | 2/1949 | Knowland . |
| 2,767,149 | 12/1952 | Wendrow . |
| 2,800,462 | 7/1957 | Sverdrup . |
| 2,804,651 | 9/1957 | Peterson . |
| 3,268,380 | 8/1966 | Guichon et al. .................... 156/397 |
| 3,592,444 | 7/1971 | Arvanitakis ......................... 366/155 |
| 3,873,474 | 3/1975 | Ficker . |
| 4,101,463 | 7/1978 | Morgan et al. . |
| 4,146,508 | 3/1979 | Maxwell . |
| 4,152,076 | 5/1979 | Driskill ................................ 366/319 |
| 4,171,165 | 10/1979 | Card .................................... 366/143 |

*Primary Examiner*—Robert W. Jenkins
*Assistant Examiner*—Arthur D. Dahlberg
*Attorney, Agent, or Firm*—Lyon & Lyon

[57] ABSTRACT

Blending reclaimed rubber buffing dust with tread rubber for tire retreading includes feeding buffing dust from a container through a discharge pipe into a hopper which receives the tread rubber horizontally in a ribbon form. An auger from the discharge pipe which is vertically orientated meters the buffing dust onto the tread ribbon in a predetermined measured quantity and in a direct feed, so as to affect a suitably blended rubber product for tire retreading.

17 Claims, 5 Drawing Figures

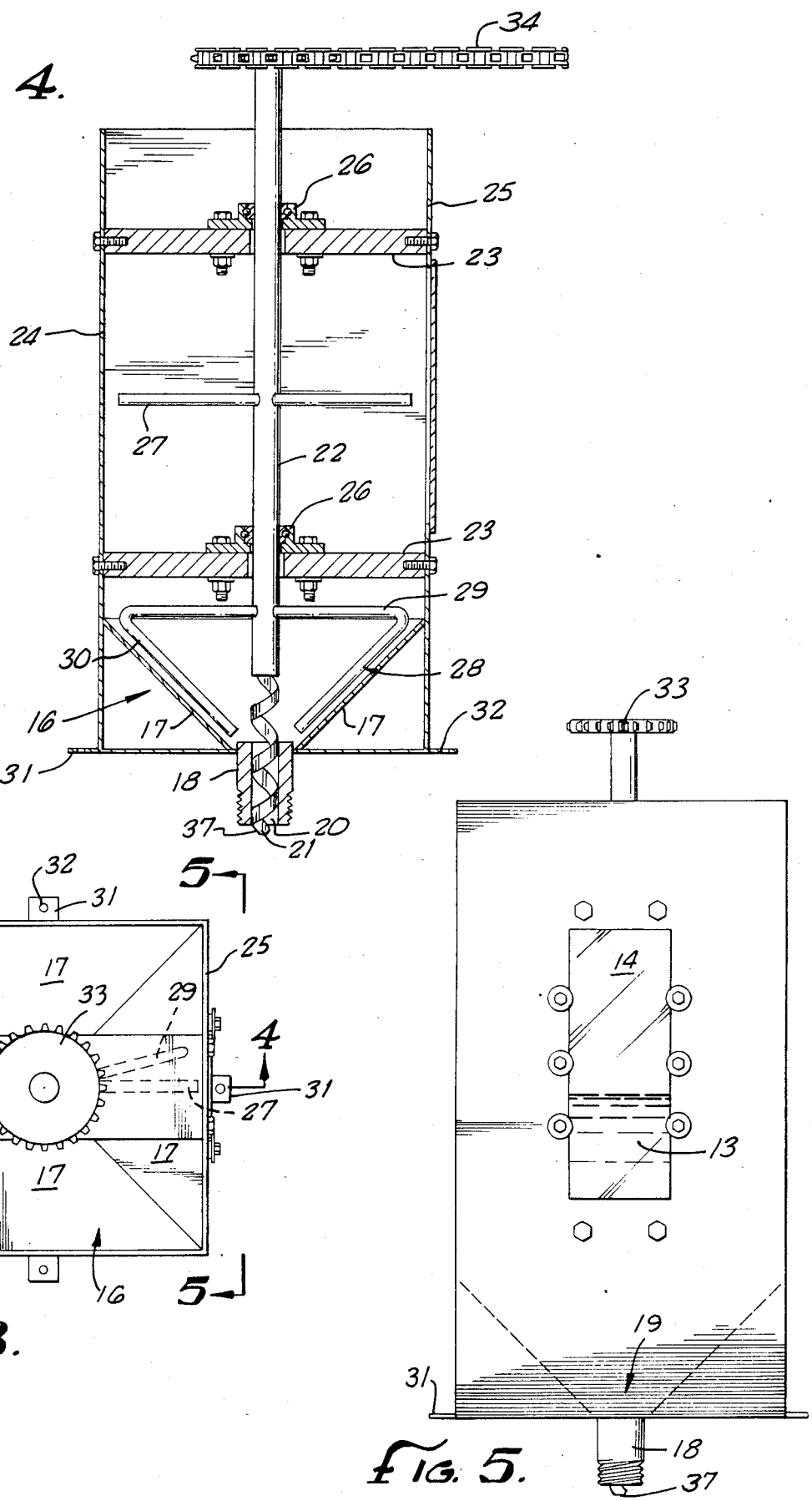

BLENDING RUBBER FOR RETREADING

BACKGROUND OF THE INVENTION

This invention relates to blending reclaimed rubber elements with tread rubber to produce a rubber product for tire retreading. In particular the invention is concerned with blending rubber buffing dust with ribbon tread rubber whereby there is obtained a rubber extended strip product for winding on a tire casing.

During retreading procedures the casing of a tire which is to be retreaded undergoes processes which generates substantial rubber waste in the form of rubber dust or buffing dust. Conventionally such buffing dust has been discarded or wasted, but in current times where recycling of previously wasted products now is economically important, it is desirable to reuse such dust if possible.

Processes for reusing reclaimed rubber waste have long been known, but the applicant is unaware of any process for effectively reusing the buffing dust by effectively blending tread rubber, which is commercially supplied for retreading tire casings, and the buffing dust so as to provide a desirable rubber product for tire retreading.

Retreading units and machines include, for instance, the Orbitread machine (Registered Trademark) produced by the AMF Corporation. In such a machine tread rubber in ribbon form is fed into a hopper and is then extruded through a extruder screw operating in a barrel so as to be discharged in a strip form which can then be wound about a buffed casing mounted on a rotatable shaft. Prior to the rewinding or retreading process the casing is buffed to remove excess rubber, and it is this excess rubber which has conventionally been wasted.

There is accordingly a need to provide an effective means for recycling this buffed rubber dust and effectively blending this dust into the tread rubber such that the rubber for retreading is a useful, high-quality end product, whereby retreading can be less expensive than by retreading with the tread rubber alone.

SUMMARY OF THE INVENTION

The invention includes blending reclaimed rubber buffing dust with ribbon tread rubber for tire retreading. Container means to hold the rubber buffing dust is located on the housing of a retreading machine and from the container means there is a discharge pipe orientated to expel buffing dust into hopper means in the retreading machine or unit for receiving the ribbon tread rubber. The discharge pipe is preferably orientated vertically towards the hopper means. Auger means rotating in the discharge pipe meteringly expells the buffing dust from the pipe substantially directly into the hopper and in appropriate quantities relative to the feed speed of the tread ribbon.

From the hopper there is screw extruder which effectively facilitates requisite blending of the rubber and provides a tire retreading rubber product.

The auger extends through the discharge pipe such that the rubber dust is fed directly vertically onto the tread ribbon so that as the tread ribbon is drawn substantially horizontally into the mouth of the hopper the rubber dust is drawn simultaneously into the hopper.

The direct vertical feed of the dust from the container through the discharge pipe, and onto the tread ribbon and into the hopper provides an accurate means to ensure a central location of the rubber dust on the ribbon as it is drawn into the hopper so that subsequent blending, extrusion and processing can be efficiently affected.

BRIEF DESCRIPTION OF THE DRAWINGS

FIG. 3 is a plan view of the container means for the buffing dust showing the mixer means and drive means above the container.

FIG. 4 is a sectional view illustrating the mixing means and the auger discharger means extending from a rotatable shaft mounting the mixing means, and FIG. 5 is an elevational view illustrating the container for buffing dust.

DETAILED DESCRIPTION OF THE PREFERRED EMBODIMENTS

Figure 1:
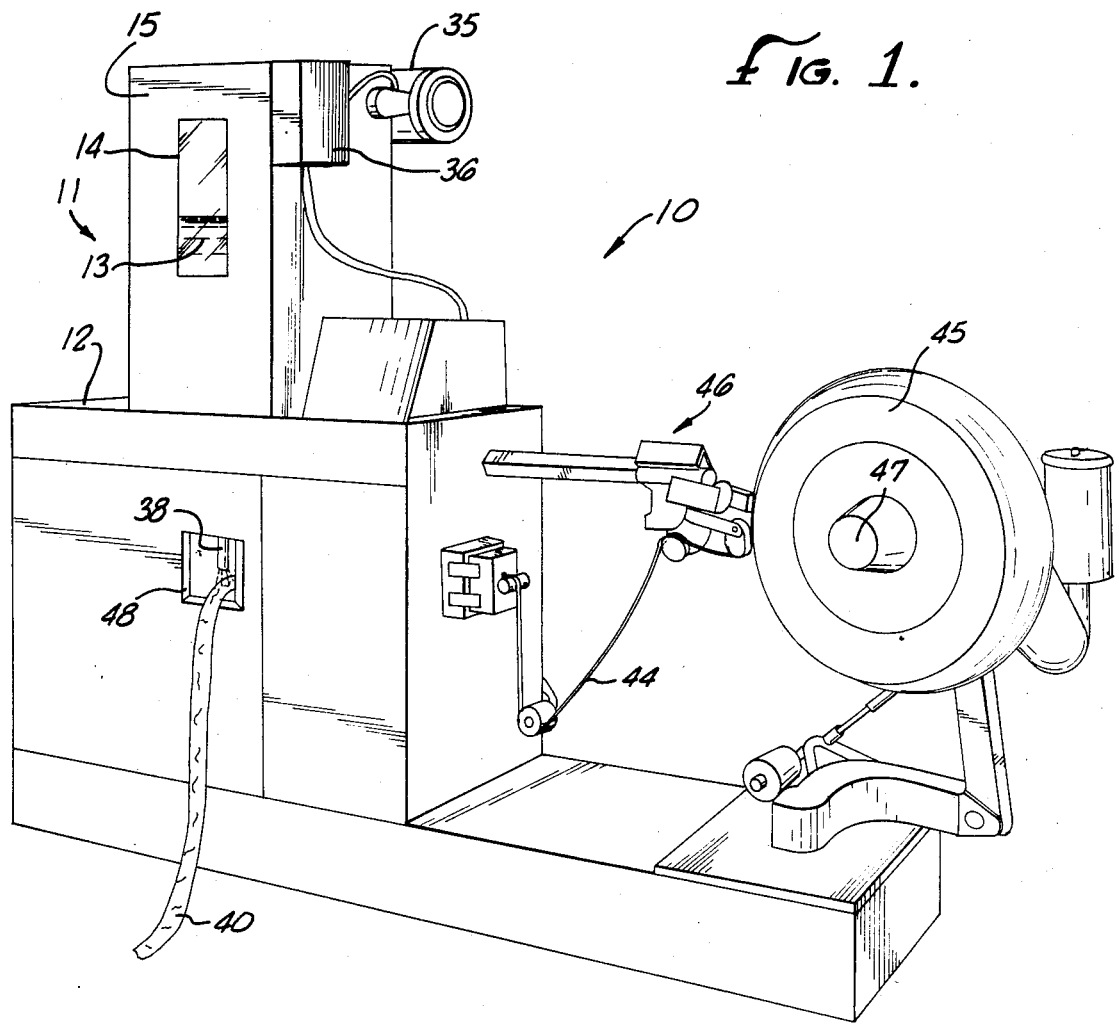
FIG. 1 is an isometric view illustrating a retreading unit with the entry chute for tread ribbon into the retreading unit and the buffing dust container on the unit housing.
Figure 2:
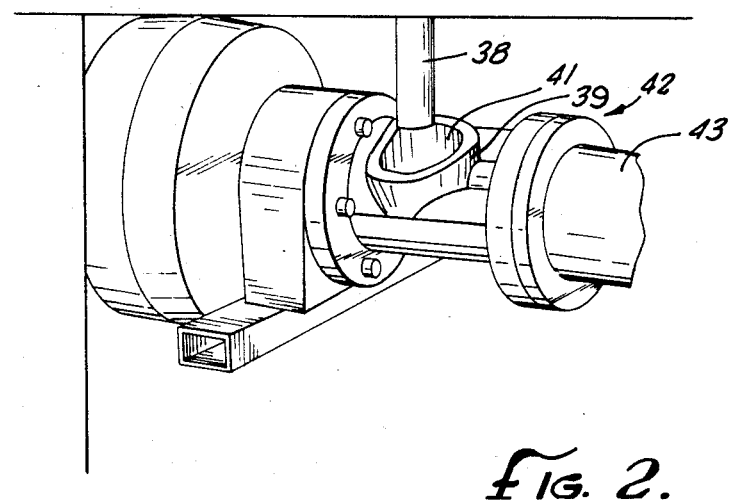
FIG. 2 is a isometric partial view illustrating the hopper mouth and discharge means for rubber buffing dust into the hopper.

Apparatus for blending reclaimed rubber buffing dust with tread rubber for tire retreading in a retreading unit or machine 10 includes a vertically orientated container 11 mounted on the housing top panel 12 of the retreading unit 10. The container 11 contains the buffing nl dust 13 which can be seen through the window 14 in the vertical wall 15 of the container 11. The container is substantially square in horizontal cross section and is located neatly on the top panel 12 of the retreading machine 10.

Within the container there is an internal base portion 16 of four downwardly sloping triangulated base portions 17 which are designed to funnel the buffing dust 13 towards a substantially central position accommodating a discharge pipe means 18 which is located centrally at the focus point 19 of the triangulated sections 17.

In the bore 20 of the discharge pipe 18 there is located, for rotation, an auger 21 which is mounted at the end of a rotatable shaft 22 which is vertically disposed within the container 11. Located in spaced positions along the shaft 22 are support braces 23 spaced from each other and horizontally disposed and mounted against the walls 24 and 25 of the container 11. Within the support braces 23 are apertures through which shaft 22 can pass and the braces 23 mount bearing means 26 so that the shaft 22 is free to rotate in the container 11.

A paddle 27 is mounted between the two support braces 23 and rotates with the shaft 22 and agitates the buffing dust 13 within the container 11. A further arm or paddle 28 mounted towards the bottom of the shaft 22 and adjacent the auger 21 is of a mating shape with the triangulated portions 17 and agitates the buffing dust near the bottom of the container 11 in the area of the triangulated base sections 17. The paddle 28 has a horizontal section 29 affects to a diagonal section 30 so that as the shaft 22 rotates the paddle 28 effectively stirs and agitates the buffing dust 13 around the base portion 16 of the container 11.

Lugs 31 extending horizontally from the base 16 of the container 11 are provided with bores 32 through which bolts or the like can pass so as to effectively fix the container 11 to the housing top panel 12. The opposite end of the rotatable shaft 22 is fitted with a horizontally disposed sprocketed cog 33 about which a chain 34 engages to be driven by a mating sprocketed cog in turn driven by a motor 35 which is electrically connected through the switching panel 36 to an electricity supply. Typically the motor 35 would be a half horse power three-phase motor rotating at 1750 rpm and the gear speed reduction effective by the sprocketed cogs 33 would be approximately 30 to 1 so that the shaft 22 rotates at the desired speed.

The auger 21 extends slightly at 37 from the discharge pipe 18 and in one embodiment feeds an extension discharge pipe 38 which is mounted immediately adjacent and above the hopper means 39 for receiving tread rubber 40 in its ribbon form. In some embodiments the discharge pipe 18 extends itself directly as part of the extension pipe 38 to the mouth 41 of the hopper 39. The mouth 41 is substantially upwardly directed so that the buffing dust 13 can be directly fed into the hopper 39 in the metered quantity. In some cases the buffing dust 13 will be expelled centrally and vertically on the tread ribbon 40 as it moves substantially horizontally towards the mouth 41 so as to be drawn into screw extrusion means 42 of the retreading machine 10. Within the extrusion means 42 there is an extruder screw which rotates horizontally and draws the tread ribbon 40 and buffing dust 13 into a barrel 43 to be expelled as a blending rubber retreading strip 44.

In use the apparatus of the invention blends the buffing dust 13 which enters through the discharge pipe 18 or extension of the discharge pipe 38 directly into the mouth 41 of the hopper 39 such that a direct extrusion can take place of the buffing dust 13 and the ribbon tread rubber 40 which is fed into the hopper 39.

The extruded retreading tire rubber product or strip 44 is wound about a tire casing 45 having been applied by an applicator on 46, the casing 45 being rotating about shaft means 47 as regulated by the retreading machine 10.

The speed of rotation of the auger 21 feeding the buffing dust 13 and the speed of feed of the tread rubber 40 can be regulated to obtain the appropriate mix and blend of reclaimed buffing dust 13 and tread rubber 40 so as to provide in an effective high quality mix in the extruder means 42 and provide a high quality rubber strip 44 for application to the casing 45. The effectively direct feed of the buffing dust 13 into the hopper mouth 41 permits the extrusion to be efficiently achieved without any wastage of buffing dust 13 which could otherwise occur if the buffing dust 13 feed to the hopper 39 was indirect or unmeasured or uncontrolled.

This efficient blending is affected by the auger 21 which meteringly regulates the discharge of the buffing dust 13 from the container 11 onto the tread rubber 40 and by having the auger 21 or discharge pipe 18 or 38 closely located with the mouth 41 of the hopper means 39. The possibility is thereby reduced of rubber dust 13 being redirected by not entering the hopper 39. In another embodiment the discharge pipe 18 or 38 and the hopper 39 are relatively further removed from the hopper 39.

The vertically disposed container 11 for holding the buffing dust 13 neatly facilitates a gravity feed of the buffing dust 13 towards the discharge point 19 of the container 11. Through the window 14 the quantity of buffing dust 13 within the container 11 can be ascertained so that it is possible visually to determine the need to add more dust 13 when appropriate from the relatively higher locaterd inlet to the container 11.

The application of the apparatus of the invention to retreading machines or units 10 can effectively be achieved by providing a suitable chute in the top panel 12 of the retreading machine and in the Orbitread (Registered Trademark) machine described above. The hopper 39 associated with the extrusion means 42 is rotated from a position where the mouth 41 normally is directed sideways to face the input chute 48 for the tread rubber 40 to a position where the mouth 41 is directed upwardly to face the input of the buffing dust 13. This does not inhibit the input of the tread rubber 40 which can still be fed through the mouth 41 into the extruder means 42. The invention therefore provides for the adaption of the existing retreading unit 10 machinery and the addition of the blending apparatus to that machinery, and in particular the adaption of the existing hopper 39 and extrusion means 42 of that machinery.

In other embodiments of the invention differently shaped containers 11 are provided, preferably, of a structure that is suitably accommodated in plate 12 of the retreading unit 10.

While there are described above certain examples of the invention and its method in practical use including modifications and alternatives, it should be understood that these are not intended to be exhaustive or to be limiting of the invention, but is to be considered of the full scope of the appended claims.

I claim:

1. Retreading apparatus including means for blending reclaimed rubber buffing dust with tread rubber for tire retreading comprising a reteading unit, container means for holding said buffing dust, vertically orientated discharge pipe means from the container means for substantially directly discharging buffing dust from the container means into an upwardly directed mouth of hopper means, said hopper means being for receiving tread rubber in substantially ribbon form, auger means extending in the discharge pipe for meteringly expelling the buffing dust from the pipe predetermined by the rotational speed of the auger and the feed speed of the tread rubber into the hopper means, screw extruder means in the retreading unit for removing tread rubber and rubber dust from the hopper means and for effectively blending the tread rubber and buffing dust together thereby to provide a blended rubber product and means for winding said blended product on a tire casing to effect tire retreading.

2. Apparatus as claimed in claim 1, wherein the container means is vertically disposed on the housing of the retreading unit, said container means including a mixer for agitating the buffing dust while the auger means feeds said dust vertically downwardly through the discharge pipe onto the tread ribbon prior to entry into the hopper means, the container including an internal base being substantially downwardly sloped towards a substantially central position accommodating the discharge pipe means.

3. Apparatus as claimed in claim 2 wherein an additional bushing directs rubber elements from the discharge pipe into the hopper mouth.

4. Apparatus as claimed in claim 2 wherein the mixer is substantially vertically mounted and includes substantially horizontal paddle means, the container means matingly accomodating the paddle means, the mixer being mounted on a shaft mounting the auger whereby auger rotation affects paddle rotation, the speed of rotation being related to the feed speed of the tread rubber into the hopper means.

5. Apparatus as claimed in claim 2 wherein the container means includes a window in an upwardly directed wall of the container means whereby a measure of the quantity of rubber elements in the container means can be visually determined.

6. Apparatus as claimed in claim 1 wherein the discharge pipe outlet is adjacent the hopper inlet.

7. Apparatus as claimed in claim 1 wherein the auger extends through the discharge pipe thereby to facilitate metering of the rubber elements from the container.

8. Apparatus as claimed in claim 1 wherein the tread rubber is located in a substantially horizontal plane.

9. Retreading apparatus including means for blending reclaimed rubber buffing dust with tread rubber for tire retreading comprising a retreading unit, container means for holding said buffing dust, discharge pipe means from the container means for discharging buffing dust from the container means towards mouth of hopper means, said hopper means being for receiving tread rubber in substantially ribbon form, means in the container for meteringly expelling the buffing dust from the container means holding said buffing dust, discharge pipe means from the container means for discharging buffing dust from the container means towards mouth of hopper means, said hopper means being for receiving tread rubber in substantially ribbon form, means in the container for meteringly expelling the buffing dust from the pipe predetermined by the feed speed of the tread rubber into the hopper means, screw extruder means in the retreading unit for removing tread rubber and rubber dust from the hopper means and for effectively blending the tread rubber and buffing dust together thereby to provide a blended rubber product and means for winding said blended product on a tire casing to effect tire retreading.

10. Apparatus as claimed in claim 9 wherein said discharge pipe means is substantially vertically oriented and discharges said buffing dust into the mouth of said hopper means, said mouth being substantially upwardly directed.

11. Apparatus as claimed in claim 9, wherein said container means is vertically disposed on a housing of the retreading unit, said container means including a mixer for agitating the buffing dust while the auger means feeds vertically downwardly through the discharge pipe onto the tread ribbon prior to entry into the hopper means, the container means including an internal base being substantially downwardly sloped towards a substantially central position accommodating the discharge pipe means.

12. Apparatus as claimed in claim 9 wherein the discharge pipe outlet is adjacent the hopper inlet.

13. Apparatus as claimed in claim 9 wherein the means in the container for meteringly expelling the buffing dust is an auger which extends through the discharge pipe thereby to facilitate metering of the rubber elements from the container.

14. Apparatus as claimed in claim 9 wherein the tread rubber is located in a substantially horizontal plane.

15. Apparatus as claimed in claim 9 wherein an additional bushing directs rubber elements from the discharge pipe into the hopper mouth.

16. Apparatus as claimed in claim 9 wherein said container means further includes a mixer substantially vertically mounted having substantially horizontal paddle means, the container means matingly accommodating the paddle means, the mixer being mounted on a shaft mounting the auger whereby auger rotation affects paddle rotation, the speed of rotation being related to the feed speed of the tread rubber into the hopper means.

17. Apparatus as claimed in claim 9 wherein the container means includes a window in an upwardly directed wall of the container means whereby a measure of the quantity of buffing dust in the container means can be visually determined.

* * * * *